United States Patent [19]

Onsrud

[11] Patent Number: 4,537,234
[45] Date of Patent: Aug. 27, 1985

[54] ROUTING MACHINES

[76] Inventor: Charles R. Onsrud, P.O. Box 416, Troutman, N.C. 28166

[21] Appl. No.: 415,012

[22] Filed: Sep. 7, 1982

[51] Int. Cl.$^3$ .................................................. B27C 5/00
[52] U.S. Cl. ........................... 144/134 A; 144/136 R; 408/136; 409/97
[58] Field of Search ............ 144/69, 74, 85, 86, 144/134 R, 134 A, 136 R; 408/129, 136; 409/97, 110

[56] References Cited

U.S. PATENT DOCUMENTS

| | | | |
|---|---|---|---|
| 2,230,292 | 2/1941 | Faso | 409/97 |
| 3,447,454 | 6/1969 | Ratz | 408/136 |
| 3,954,347 | 5/1976 | Mechalas | 408/136 |

OTHER PUBLICATIONS

"Inverted Router, Model 2003", A product brochure of C. R. Onsrud, Inc., Troutman, NC, no date.

Primary Examiner—W. D. Bray
Assistant Examiner—Jorji M. Griffin

[57] ABSTRACT

A slide and actuator mechanism for the vertical travel of the cutting tool on an Inverted pin routing machine. A slide that provides a rigid support for the cutting spindle and is durable, unaffected by wood dust, adjustable for exact alignment with top mounted guide pin, and inexpensive to manufacture. The actuator lever that moves said slide vertically by applying lifting pressure at the balance point so that the cantilevered motor mount will not cock or bind on the shaft that it rides and thus allows for gravity retract of the motorized cutting tool. Conventional shaft and bushing slides of this type use two shafts with two to four bushings riding on both shafts requiring the shafts to be in absolute perfect alignment to avoid tight spots and binding over the entire travel of the slide. Otherwise expensive alignment devices on the shafts are incorporated or extremely accurate machining methods are required, both of which would put the product price out of the range of the intended market.

6 Claims, 3 Drawing Figures

ROUTING MACHINES

BACKGROUND OF THE INVENTION

In the manufacture of wood, plastic or aluminum parts that have edges that are curved such as wood in furniture, plastic in signs and aluminum in aircraft, the curved parts must be cut with a band saw or router. A band saw requires a skilled operator to guide the blade to the line which outlines the desired shape of the part to be cut out. Because the final shape and size is controlled only by hand eye coordination, no two parts are identical. The other method is to use a router which uses a template to control its cutting path. Although it is still a hand operated machine of similar basic cost, the fact that a template is used to control the cutter path enables even an unskilled operator to produce large quantities of parts that are all identical in size and shape.

Routing machines normally consist of a high speed motor or belt driven spindle in the 20,000 RPM range which is coupled with a side milling tool having a number of ridges defined by flutes to provide clearance for removal of cut material.

These high speed motors or spindles with their side milling tool, are used in three basic types of routing machines; portable, broken arm (radial arm), and pin type routers. The portable and broken arm are similar in that they both use a guide bushing to guide against the template with the cutting tool extending down through the center of the bushing thus requiring an off-set template to allow for the bushing diameter which is larger than the cutting tool diameter. Thus special templates must be made up to accomodate the bushing to cutter relationship.

The pin type router uses a stationary pin that is in exact axial alignment with the cutting tool and is interchangeable to correspond to the diameter of the cutting tool, which allows the template to be the exact shape and size of the part being manufactured. In this case a sample chart can often be used as a template.

There are presently two basic types of pin routers on the market; the overhead router and my Inverted Router. The overhead router has been in existence for over 60 years. These machines have always been built basically the same since their inception. This normally consists of a high speed spindle, either direct motor driven or belt driven mounted to an overarm directly above the table with a guide pin mounted in the table in exact alignment with the spindle above. With the guide pin mounted in the table, the template must be lifted and placed over the guide pin obscuring the operator's view of the template configuration. The work piece is clamped to the template and all the operator can see is a blank piece of material and a very dangerous cutting tool in front of his face. The cutter is lowered into the work piece with a foot pedal control either mechanically or pneumatically. The piece part and template are clamped together as one unit, and are moved along the desired path which is dictated by the template. Keeping the guide pin engaged in the template groove is done by feel since the operator cannot see the pattern in the template as it is face down on the router table. With the operator's hands and the cutting tool engaged in the work piece at the same level, a slip of the hand could be hazardous if it contacted the cutting tool. The above has been the accepted method of routing in most all furniture and woodworking plants throughout the world over the last 60 years or more.

The other type of pin router is my Inverted Router. It also consists of a high speed spindle either direct motor driven or belt driven, mounted in the base of the machine with the spindle movable vertically to a point just below the top surface of the router table. The retractable guide pin is mounted in the over arm of the router. In other words, guide pins and router bits have traded places in the Inverted Router compared to the old style over head machine.

The many advantages to the inverted type router are; the template is on top of the work piece face up so the operator can engage the guide pin into the template visually; the shape in the template is visible so the path of the template is easily followed; the cutting tool comes up from below the table, controlled by a foot pedal (either mechanically or pneumatically) and engages the work piece which is below the template; the cutter is obscured by the template so the operator's hands are not exposed to the cutting tool. While the cutting tool is cutting its path through the work piece a very efficient suction system is helping along with gravity and the cutting action of the tool, to pull the chips out of the cut which improves cutting efficiency and makes for better working conditions for the operator. Noise levels are much improved on the Inverted Router since high speed spindle noise is confined to the base of the machine below the table rather than up on the over arm near the operator's ears. Simple templates are another main advantage of my Inverted Router. With the template on top and the piece part sandwiched between the table and template, firm clamping of part and template is not necessary. Light finishing nails, shallow spurs or even double faced tape can be used to keep the template or sample part from slipping while cutting a new part. The above feature brought to realization that the Inverted Router was ideal for the small low production shop as well as the large high volume plant.

The model 2003 Inverted Router wad developed for this small shop market.

A unique slide was needed for this machine to enable the operator to have full plunge and depth control on this inexpensive but accurate machine.

SUMMARY OF THE INVENTION

The invention disclosed herein seeks to provide a rigid router spindle mount and slide that overcomes the problem of looseness inherent in a free moving slide. (such as shafts with ball bushings that rattle and that would quickly clog with saw dust if used in this application.)

The spindle mount also provides a slight amount of front to back horizontal plane adjustment to compensate for the inaccuracy in concentricity of the spindle housing to spindle axis from one commercial router motor to another. The fine adjustment enables the machine user to maintain axial alignment between router spindle and guide pin which is essential for accurate size control of routed parts.

Another objective of this invention is a slide that is inexpensive and durable. The bushing and shafts in this slide are manufactured in large quantities for the tool and die industry out of the best of materials that are hardened, ground and honed to extremely close tolerances. Because of being mass produced these shafts and bushings are inexpensive considering their precision and durability. My cost is further kept down with my slide design where by the motor mount is riding on only one shaft with one bushing using the second shaft only as a constant for my alignment adjusting screws. If a more conventional shaft and bushing slide were used costs would be considerably higher, because the shafts would have to be in absolute perfect alignment. This would require very expensive machining operations or elaborate alignment devices on every machine which would price my router out of the small shop price range.

In the manufacture of this slide the bushing is mounted in a cast iron bracket that has been machined to accept the high speed router spindle and the bushing. The bushing cannot be pressed into the machined bore but must be bonded with an adhesive because the clearance is so close between the bushing and shaft that any distortion due to pressing would cause binding between shaft and bushing. Because I use only one bushing instead of two, as would be used in conventional slides of this type, I do not have to have the second shaft (used for horizontal plane alignment) absolutely parallel with the other. Because of the extremely close tolerance between shaft and bushing, the alignment of the two shafts would have to be exact to prevent binding in the slide. Exact alignment of two shafts would be very expensive. The one bushing has sufficient bearing length to prevent any binding in the slide movement. The extremely close tolerance between the hardened ground shaft and bushing serves another purpose. It provides a wiping action to keep out dirt and dust without the use of external wipers which would add friction to the slide movement. The fit between the bushing and shaft are so close that only oil may be used as a lubricant. The viscosity of grease will not allow it to flow between the shaft and bushing.

The pressure point for pushing the slide along its axis of travel is very important. It must be as close to the bushing as possible but between the bushing and the weight of the router spindle to accomplish a smooth floating movement. The lifting movement in my invention is accomplished by a cast iron lever arm pivoted up near the underside of the table.

To complete the actuating mechanism I use a steel rod with threaded ends to connect between the lever arm and the foot pedal lever. This rod can be easily moved between different hole locations in the lever arm and foot pedal lever to increase or decrease the ratio of router spindle movement to foot pedal travel. Also this rod can be lengthened to allow the operaor to adjust the height of the foot pedal from the floor so that he may be in the most comfortable position when the cutter engages the workpiece. Should any of these links or connections break through wear or abuse the router spindle will drop by gravity to its home position, safely below the machine table.

It is an object of this invention to provide a safe, durable and accurate slide in an inverted routing machine that can be manufactured at a reasonable price for the small woodworking shop.

It is another object of this invention to provide a simple, safe, inexpensive, and versatile actuator mechanism to move the router spindle on the vertical axis of said slide.

It is still a further object of this invention to have a simple and positive multiple position depth stop incorporated in said slide arrangement.

The additional objects and advantages of the present invention will become apparent as the following description proceeds and the features of novelty which characterize this invention are pointed out with particularity in the claim annexed to and forming a part of this specification.

DESCRIPTION OF THE PREFERRED EMBODIMENT

Figure 1:
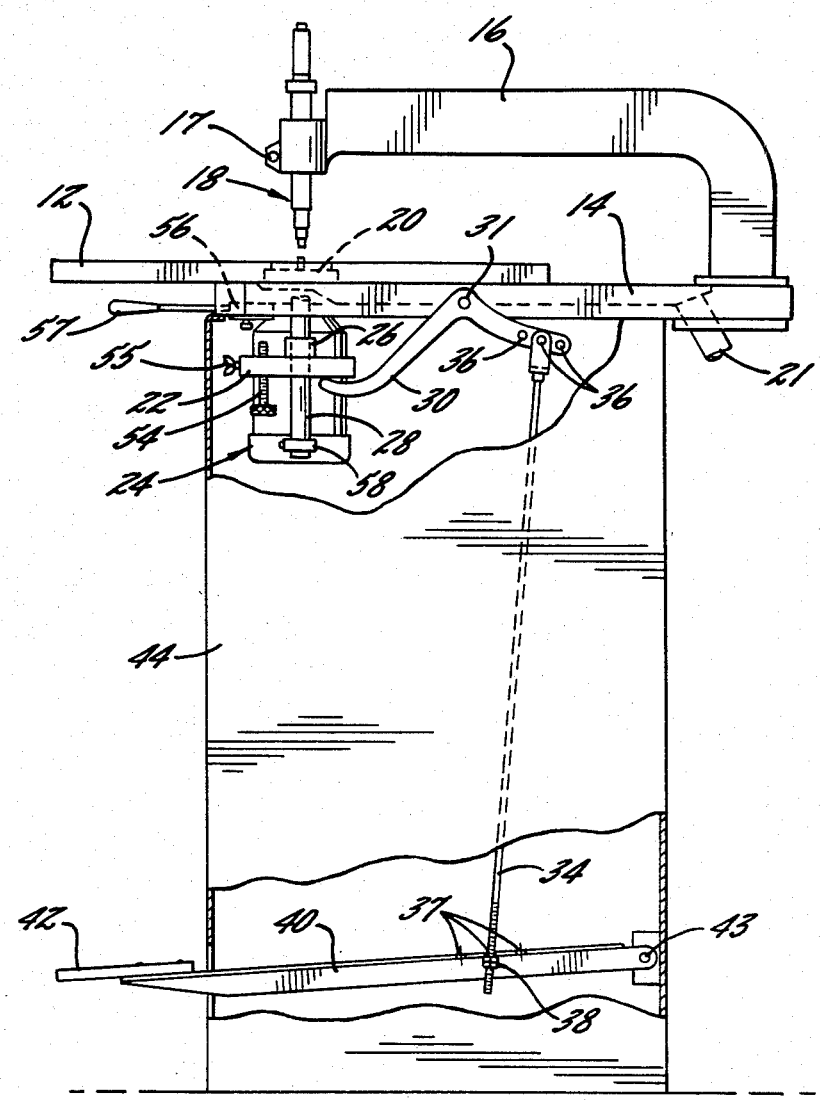
FIG. 1 is a side cut away view of the complete model 2003 as it is presently being manufactured and sold to the woodworking trade. (First public showing January 1982.)
Figure 2:
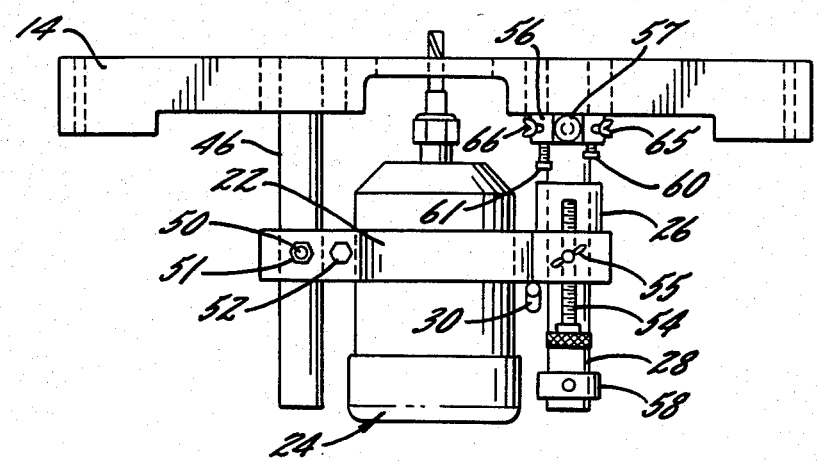
FIG. 2 is a front view showing details of the motor mount and slide arrangement.
Figure 3:
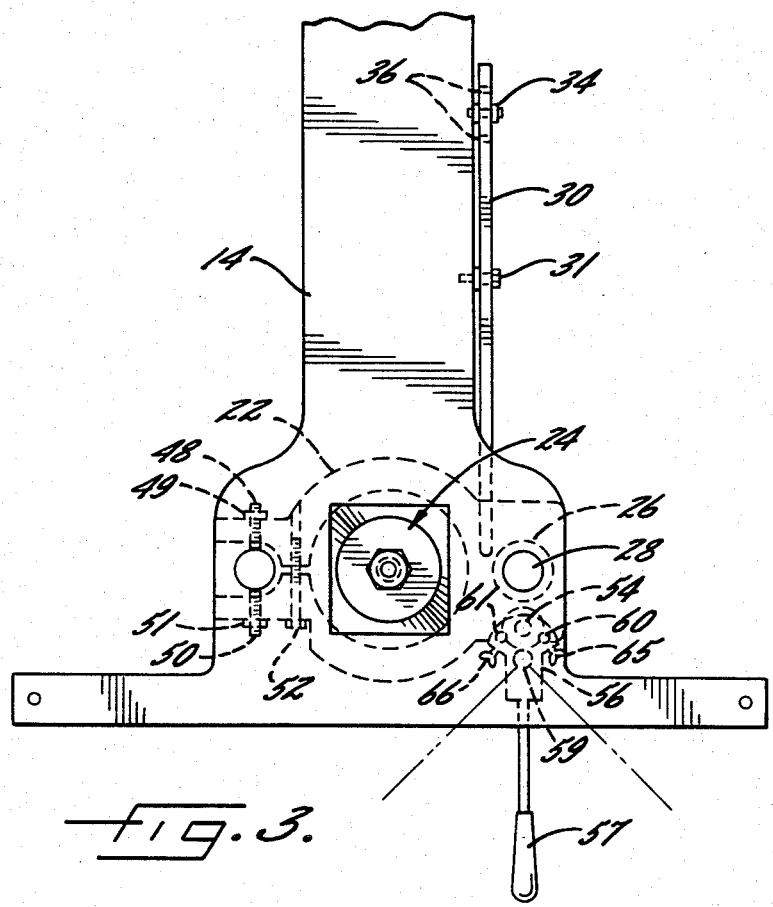
FIG. 3 is a top view of the motor mount and slide showing the location of the optional multi-position depth stop.

Referring to the drawings by numerals of reference and more particularly to FIG. 1 there is shown an assembly view, in side elevation, of an inverted routing machine, model 2003, with cut away areas to show the location of the slide and actuator mechanism in relation to the rest of the machine. The router generally designated 10 comprised of a bent metal stand 44 which, with one sheet of steel, makes the two sides, back, and partially open front, (for access to the router motor/spindle unit). Machine stand 44 supports and bolts to the cast iron machine base 14. Fastened to the machine base 14 is the work support table 12 and the cast iron guide pin support arm 16 which rigidly supports and aligns the guide pin assembly 18 with the axis of the router motor/spindle unit 24. Guide pin assembly 18 can be adjusted vertically to accomodate varying thicknesses of material by sliding it up or down after loosening clamp screw 17. Incorporated in with the work support table 12 is a round aluminum grill 20 that covers the opening where the chips from the routing process are pulled into the dust collection chamber 15 which is built into the cast iron machine base 14. The dust and chips are sucked through chamber 15 and out through the shop vacuum hose connection 21. Fastened with adhesive into two accurately bored holes in the cast iron machine base 14 are the hardened and ground shafts 28 and 46 (FIG. 2). In FIGS. 1 and 2 the cast iron motor mount 22 is machined to accept the diameter of the router motor housing 24 and to accept the slide bushing 26 which is permanently fastened into the motor mount 22 with adhesive since any mechanical means could distort the bushing sufficiently to cause binding when sliding on shaft 28. In FIGS. 2 and 3 the motor mount 22 is split to accommodate clamping action provided by clamp screw 52. Router motor 24 motor mount 22 and slide bushing 26 constitute the moving part of the slide which rides on shaft 28 by the fact that bushing 26 has been machined and honed to such a close fit to shaft 28 that it surrounds said shaft 28 so closely that there is only clearance for light oil lubrication but not enough clearance to allow foreign material in between the bore of the bushing 26 and the O.D. (outer diameter) of the shaft 28. Also there is sufficient length (3 inches) to the internal bearing surface of bushing 26 riding on shaft 28 to prevent deflection of the cantilevered motor mount 22 at the extreme out-board end where axial alignment screws 48 and 50 with lock nuts 49 and 51 are used to provide fine front to back axial alignment of the router motor/spindle 24 to the axis of the guide pin assembly 18 (FIG. 1). In FIG. 3 screws 48 and 50 have a blunt point contact with shaft 46 and in addition to providing fine front to back alignment act as the other half of the motor slide providing a low friction slide and preventing the motor mount from swinging about the axis of shaft 28 which is round. The round shaft 28 and bushing 26 give the slide accuracy and smooth operation while shaft 46 and screws 48 and 50 prevent rotation about shaft 28, allow for axial alignment, are easily adjusted to compensate for wear, the adjustment of how freely the slide is desired to move, and are inexpensive.

Screws 48 and 50 are tightened or loosened respectively depending on which way the motor mount is to be moved. As an example, looking at FIG. 3, if it is desired to move the center of the router spindle toward the front of the machine slightly, then screw 48 would be loosened and screw 50 would be tightened. When the desired position is obtained screws 48 and 50 are adjusted so that there is no rattle between the shaft 46 but not so tight to prevent vertical movement of the motor mount 22. When properly adjusted lock nuts 49 and 51 are tightened to prevent screws 48 and 50 from vibrating loose. Slight left to right adjustment is accomplished by loosening clamp screw 52 (FIGS. 2 and 3) and rotating the router motor/spindle 24 within the motor mount bore 22, as the spindle axis is no concentric with the O.D. of the housing of the motor/spindle 24. The combination of these two movements, Rotating the housing and adjusting screws 48 and 50 allow for a slight amount of axial alignment.

Motor mount 22 (FIGS. 1 and 2) router motor 24 and slide bushing 26 are moved vertically along shafts 28 and 46, by applying vertical lifting pressure through actuator lever arm 30, that is applying the lifting pressure at the balance point of friction and weight which is between router motor 24 and slide bushing 26. Lifting pressure is applied to actuator lever arm 30 (FIG. 1) by foot pressure on foot pedal 42 which lowers arm 40 in an arc about its pivot point 43 which pulls down on connecting link 34 which is fastened to lever arm 30 at one of the three optional points 36, depending on the desired amount of mechanical advantage. Connecting link 34 (FIG. 1) can be located in one of 3 holes 37 and adjusted to proper length and feel for the operator by moving lock nuts 38 up or down the threaded end of connecting link 34 to suit proper foot pedal height. A downward force on actuator arm 30 (FIGS. 1 and 2) at end 36 and pivoting at point 31 produces a lifting action on motor mount 22 by the actuator arm 30 at the point indicated in FIG. 2.

When foot pressure is removed from foot pedal 42 gravity lowers motor mount 22 router motor 24 and slide bushing 26 to its home position which is controlled by the position of set collar 58 on shaft 28.

Final vertical travel (or height of router bit above table) is controlled by the depth stop screw 54 (FIGS. 2 and 3) contacting depth stop casting 56. Screw is adjusted up or down by turning knob until desired cutter height is obtained then the screw 54 is locked in place by tightening thumb screw 55. Slide travel at the bottom of the travel is restricted by set collar 58 which can be moved up shaft 28 and locked with set screw to hold router motor in the cutting position without holding the foot pedal down. The optional 3 position turret depth stop (FIGS. 2 and 3) is used along with depth stop screw 54 to control depth of cut to three per-set levels. With depth stop handle 57 (FIG. 3) in the center position as shown in FIG. 3 depth stop screw 54 stops against depth stop casting 56 between depth stop screws 60 and 61. Moving handle 57 left about its pivot 59 until it stops will position screw 61 in line with main depth stop screw 54 which shortens the slide travel by the amount that screw 61 projects from the surface of depth stop casting 56. Likewise moving handle 57 to the right stop, positions screw 60 in line with main depth stop screw 54 which gives the 3rd depth setting. Screws 60 and 61 are screwed in or out of casting 56 for different amounts of variation in depth and they are then locked with thumb screws 65 and 66.

I claim:

1. In an inverted pin routing machine, a router spindle slide having a first vertically aligned shaft attached to a machine base and adapted to receive a close fitting bushing, said bushing being the primary bearing surface for guiding a router spindle carried by a router mount in the vertical direction; a second vertically aligned shaft spaced apart from said first shaft attached to said machine base and fine adjustment screws attached to said router mount, said screws engaging said second shaft to prevent rotation of said router mount about said first shaft; said screws further allowing axial alignment of the router spindle and being adjustable to compensate for wear and to control the relative freedom of the vertical sliding of the router spindle with respect to the shafts.

2. In an inverted pin routing machine according to claim 1, wherein said router spindle slide includes means for moving said router mount in the vertical axis along said first and second shafts, said moving means comprising; means for lifting said router mount into and out of operating position, wherein said lifting means engages said router mount at a balance point between said first and second shaft and closer to said first shaft to prevent binding of said first shaft in said bushing and to permit said second shaft to function primarily as a guiding and aligning means for said rotor mount.

3. In an inverted pin routing machine according to claim 2, wherein said means for lifting said router mount engages said router mount at said balance point between said first shaft and said router spindle axis.

4. In an inverted pin routing machine according to claim 2, wherein said means for lifting said router mount includes a lever arm.

5. In an inverted pin routing machine according to claim 4, wherein said lever arm includes an operator controlled foot pedal mounted near the bottom of the machine.

6. In an inverted pin routing machine according to claim 2, and further including means for limiting the upward travel of said router mount.

* * * * *